United States Patent [19]

Weiler et al.

[11] Patent Number: 4,753,326
[45] Date of Patent: Jun. 28, 1988

[54] PIN GUIDE AND DAMPING BUSHING FOR THE CALIPER OF A FLOATING CALIPER SPOT-TYPE DISC BRAKE

[75] Inventors: Rolf Weiler, Frankfurt am Main-Sindlingen; Claus-Peter Panek, Steinbach, both of Fed. Rep. of Germany

[73] Assignee: Alfred Teves GmbH, Frankfurt am Main, Fed. Rep. of Germany

[21] Appl. No.: 45,214

[22] Filed: Apr. 30, 1987

Related U.S. Application Data

[63] Continuation of Ser. No. 718,852, Apr. 2, 1985, abandoned.

[30] Foreign Application Priority Data

Apr. 4, 1984 [DE] Fed. Rep. of Germany ....... 3412543

[51] Int. Cl.⁴ .............................................. F16D 65/14
[52] U.S. Cl. .............................. 188/73.44; 188/322.17; 384/221; 384/222; 384/297
[58] Field of Search ............. 188/73.44, 73.45, 322.17; 262/153; 384/221, 222, 297, 299, 300

[56] References Cited

U.S. PATENT DOCUMENTS

| 2,989,355 | 6/1961 | Terhorst ...................... 308/DIG. 7 |
| 3,563,621 | 2/1971 | Gruss ................................. 384/222 |
| 4,200,173 | 4/1980 | Evans et al. ...................... 188/73.45 |
| 4,308,938 | 1/1982 | Denton ........................... 384/300 X |

FOREIGN PATENT DOCUMENTS

| 2931804 | 4/1981 | Fed. Rep. of Germany ... 188/73.44 |
| 1237789 | 6/1960 | France ................................. 384/297 |
| 2041121 | 9/1980 | United Kingdom ............. 188/73.44 |
| 2142395 | 1/1985 | United Kingdom . |

Primary Examiner—George E. A. Halvosa
Attorney, Agent, or Firm—James B. Raden; Robert P. Seitter

[57] ABSTRACT

A pin guide and damping bushing for the caliper of a floating-caliper spot-type disc brake which is provided with a brake carrier and a caliper axially slidable relative to the brake carrier and straddling a brake disc and brake shoes. The brake carrier or the caliper is provided with a least one pin which is guided in a bore of the caliper or of the brake carrier. At least one elastic guide element (4) is provided for the pin and inserted in the bore, a stop element (6) which on itself is rigid and limits radial motions of the pin within the bore and which is configured with a base body having a substantially circular cylinder-shaped cross-section and is provided with outwardly extending extensions (26) constituting stop faces. One section of the damping and guide element (4) is arranged in interstices which are formed externally between said extensions.

6 Claims, 1 Drawing Sheet ns, only one of which being marked in the drawing with reference number 26. Advantageously, the position and size of the extensions 26 are selected such that several ribs are in action at any moment under load, as a result whereof elevated bearing forces allow to be absorbed without major deformation, so that sufficient space will remain anyway between the extensions for the elastic material of the damping and guide element in order to achieve a sufficient strength of the damping bushing as a whole. The internal diameter of the hollow cylindrical base body 24 of the stop element 6 is dimensioned so as to provide for a minor play with respect to the guide pin arranged inside it, for example a radial play of 0.3 mm in case of a pin diameter of approximately 13 mm. In this way it is safeguarded that in all normal cases exclusively the rubber lips are in contact with the guide pin. In the range between the projections 10, 12 recesses 2 are provided in the elastic damping and guide element 4 which correspond in number to the extensions 26. In these recesses 28, the extensions 26 of the stop element 6 are arranged. For that purpose, the recesses 28 present a contour adapted to the shape of the extensions 26, so that the extensions 26 come to be closely embedded in the elastic material of the damping and guide element. Since the cylindrical base body 24 of the stop element 6 is configurated slightly longer in axial direction than the extensions 26, shoulders 32, 34 are formed in the range of transition between the base body 24 and the extensions 26. Corresponding to these shoulders 32, 34, shoulders 36, 38 are provided at the

PIN GUIDE AND DAMPING BUSHING FOR THE CALIPER OF A FLOATING CALIPER SPOT-TYPE DISC BRAKE

This application is a continuation of application Ser. No. 718,852, filed Apr. 2, 1985, now abandoned.

BACKGROUND OF THE INVENTION

The present invention relates to a pin guide and damping bushing for the caliper of a floating-caliper spot-type disc brake.

A pin guide and damping bushing of this type has been proposed in German patent application P 3,323,737. On principle, the proposed solution works satisfactorily and constitutes a major improvement over the prior art technical knowledge. However, the function of the pin guide and damping bushing can be still further improved when, in accordance with the teachings of the present invention, the wall thickness of the section of the damping and guide element arranged in the interstices of the stop element is substantially equal to or smaller than the height of the extensions as seen in radial direction and when the internal diameter of the stop element is larger than the internal diameter of those portions of the damping and guide element which are juxtaposed to the stop element. In other words, the portions of the damping and guide element arranged between the extensions of the stop element should not, according to the present invention, project in radial direction beyond the extensions, so that the extension are permitted to come into immediate and unobstructed abutment with the inside wall of the bore in this range. There remains a play of, for example, 0.3 mm between the pin and the internal diameter of the stop element. In this manner, the carrier body is advantageously allowed to absorb radial support reactions separately from the elastic damping and guide element and without the influence of the latter. On the other hand, the damping and guide element is allowed to perform its damping and sealing functions in radial direction separately from the stop element and without being influenced by the latter. In this configuration, the full thickness of the elastic damping and guide element is available for the damping duty.

SUMMARY OF THE INVENTION

In an advantageous embodiment, the base body of the stop element is longer in axial direction than the extensions. Expediently, the supporting element consists of a plastic material, in particular a fiber-reinforced thermoplastic material. In this context, the marginal ranges or marginal layers of the supporting element in radial direction are kept free of glass fibers.

According to another embodiment of the present invention, outside the section arranged in the interstices as seen in axial direction, radial projections are provided at the damping and guide element which project radially beyond the external bounding surface of the section arranged in the interstices. These projections are expediently given a ring-shaped configuration and are provided on either side of the section arranged in the interstices at an axial distance from the latter.

BRIEF DESCRIPTION OF THE DRAWINGS

One embodiment of the present invention and its versions is described in the following and illustrated in the accompanying drawing, in which.

DETAILED DESCRIPTION

Figure 1:
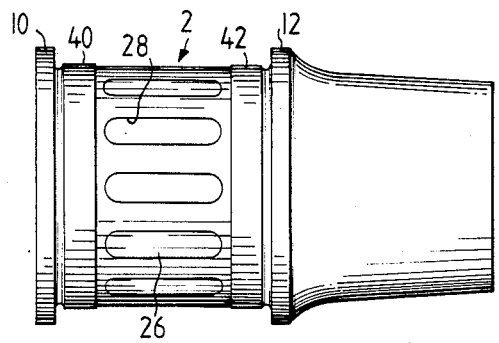
FIG. 1 is a top plan view of the pin guide and damping bushing.
Figure 3:
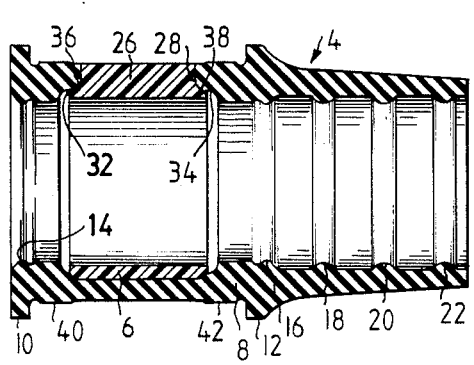
FIG. 3 is a longitudinal section through the pin guide and damping bushing of FIG. 1 along the line III—III in FIG. 2.
Figure 2:
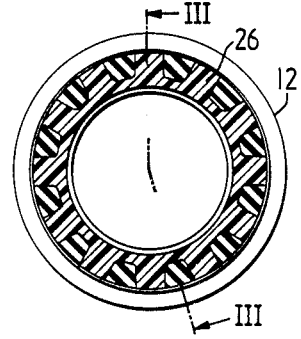
FIG. 2 is a cross-sectional view of the pin guide and damping bushing of FIG. 1.
Figure 4:
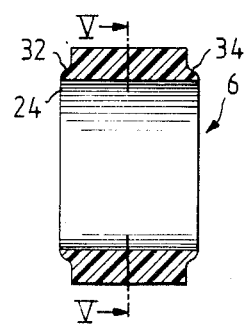
FIG. 4 is a longitudinal section through the stop element of the pin guide and damping bushing according to FIGS. 1 to 3; and, FIG. 5 is a cross-section along the ling V—V through the stop element of FIG. 4.
Figure 5:
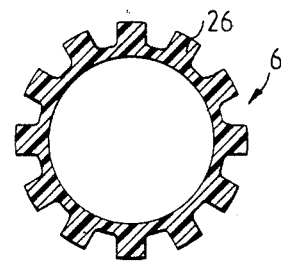

The pin guide and damping bushing 2 shown in the drawing comprises two elements, namely an elastic damping and guide element 4 and of a stop element 6 coupled to the damping and guide element 4 in a positive locking configuration. The elastic damping and guide element 4 has a substantially cylindrical base body 8. At the base body 8, there are provided at a distance from each other two external circumferential radially extending projections 10, 12 which project, however, only at a minor extent. For example, 0,15 mm beyond the diameter in the range of the section arranged in between them. Through these projections 10, 12 the pin guide and damping bushing are abutted with the surfaces bounding the bore of the caliper (not shown). On its inside, the base body 8, is provided with radially inwardly extending circumferential lips 14, 16, 18, 20 and 22 which are in abutment, in mounted condition, against a pin (not shown) penetrating through the bore and which dampingly center that pin.

The stop element 6 is positioned in the range between the two projections 10 and 12 of the elastic damping and guide element 4. The stop element 6 has a substantially cylindrical base body 24 which is provided with a number of radially outwardly extending elongated extensions, only one of which being marked in the drawing with reference number 26. Advantageously, the position and size of the extensions 26 are selected such that several ribs are in action at any moment under load, as a result whereof elevated bearing forces allow to be absorbed without major deformation, so that sufficient space will remain anyway between the extensions for the elastic material of the damping and guide element in order to achieve a sufficient strength of the damping bushing as a whole. The internal diameter of the hollow cylindrical base body 24 of the stop element 6 is dimensioned so as to provide for a minor play with respect to the guide pin arranged inside it, for example a radial play of 0.3 mm in case of a pin diameter of approximately 13 mm. In this way it is safeguarded that in all normal cases exclusively the rubber lips are in contact with the guide pin. In the range between the projections 10, 12 recesses 2 are provided in the elastic damping and guide element 4 which correspond in number to the extensions 26. In these recesses 28, the extensions 26 of the stop element 6 are arranged. For that purpose, the recesses 28 present a contour adapted to the shape of the extensions 26, so that the extensions 26 come to be closely embedded in the elastic material of the damping and guide element. Since the cylindrical base body 24 of the stop element 6 is configurated slightly longer in axial direction than the extensions 26, shoulders 32, 34 are formed in the range of transition between the base body 24 and the extensions 26. Corresponding to these shoulders 32, 34, shoulders 36, 38 are provided at the ends of the recesses 28 of the damping and guide element 4, so that in the mounted condition, the shoulders 32, 34 of the stop element 6 are abutted against the shoulders 36, 38 of the damping element 4. The wall thickness of the section of the damping and guide element 4 which is positioned in the interstices of the stop element 6 is substantially equal to or slightly smaller than the height of the extensions as seen in radial direction. In other words, the elastic damping and guide element does not in the range of the extensions 26 project beyond these extensions 26 in radial direction. In this context, the range with an equal or smaller diameter is expediently prolonged a certain extent in axial direction beyond the range of the projections. Adjacent to that range, there are provided ring-shaped radial projections 40, 42 on either side of the damping element 4. These radial projections have a diameter but slightly larger than the portion arranged between the extensions 26, for example 0.3 mm in case of a diameter of the damping element 4 of approximately 20 mm.

Expediently, the stop element 6 is made of high-strength heat-resisting fiber-reinforced thermoplastic material. In this case, the radially marginal layers of the stop element 6 including the extensions 26 remain free of glass fibers. According to the invention, manufacture is by spray-coating of the stop element 6. During this procedure, the mold mandrels required for the manufacture of the damping element 4 seal the front ends on either side of the stop element 6. This provisions in intended to exclude the penetration of rubber on the internal diameter of the stop element 6 and to safeguard that the non-sticking characteristics of the plastic material are fully retained. It is so ensured that the non-sticking characteristics owed to the use of suitable plastic materials are, indeed, preserved to the full even in the event of the guide pin coming to take support at the stop element 6.

The axial front faces of the stop element 6 are expediently utilized as catch faces for a molding die to be applied at these faces in order to prevent that in the course of spray-coating of the stop element 6 with the elastic material of the damping element 4, this material penetrates into the interior of the stop element, thereby impairing the surface of the stop element 6 which coacts with the guide pin.

What is claimed is:

1. A pin guide and damping bushing adapted for use with a pin connecting a brake carrier and a caliper of a disc brake assembly, said pin guide and damping bushing comprising: an elastic damping and guide element and a stop element; said damping and guide element comprising a body member having a cylindrical opening extending therethrough, lip means formed in said opening for gripping and dampingly centering a pin extending through said opening, a first circumferential shoulder formed on the outer surface of said body member at one end of said cylindrical opening, a second circumferential shoulder formed on the outer surface of said body member intermediate the ends of said cylindrical opening whereby said shoulders are operative to mount said body member on a caliper, and a plurality of axially extending recesses formed in said body member between said shoulders; said stop element comprising a rigid generally cylindrical body member having an internal bore and a plurality of radially outwardly extending extensions formed on its outer surface, the diameter of said internal bore being larger than the inner diameter of said lip means and said extensions being located in said recesses such that wall portions of that section of said damping and guide element are located between said recesses, the thickness of said wall portions being no greater than the height of said extensions in the radial direction, the internal diameter of said internal bore being smaller than the internal diameter of axially extending portions of said damping and guide element adjacent each end of said recesses.

2. A pin guide and damping bushing as claimed in claim 1, wherein said body member of said stop element is longer in axial direction than said extensions.

3. A pin guide and damping bushing as claimed in claim 2, wherein said stop element is made of plastic material.

4. A pin guide and damping bushing as claimed in claim 3, wherein said stop element is made of a fiber-reinforced thermoplastic material.

5. A pin guide and damping bushing as claimed in claim 4, wherein the radially marginal layers of said stop element and/or of said extensions are free of glass fibers.

6. A pin guide and damping bushing as claimed in claim 1, wherein a radially extending ring-shaped projection is formed on the body member comprising said damping and guide element adjacent each end of said axially extending recesses, said ring-shaped projections projecting radially beyond said extensions formed on said stop member.

* * * * *